(12) United States Patent
Ren et al.

(10) Patent No.: US 12,458,350 B2
(45) Date of Patent: Nov. 4, 2025

(54) STAPLE CARTRIDGE WITH RETRACTABLE KNIFE ASSEMBLY

(71) Applicant: Covidien LP, Mansfield, MA (US)

(72) Inventors: Ping Ren, Shanghai (CN); Syed Sarfraz Ahamed, Shanghai (CN); Jiangfeng Zhang, Shanghai (CN)

(73) Assignee: Covidien LP, Mansfield, MA (US)

( * ) Notice: Subject to any disclaimer, the term of this patent is extended or adjusted under 35 U.S.C. 154(b) by 454 days.

(21) Appl. No.: 17/907,886

(22) PCT Filed: Feb. 28, 2020

(86) PCT No.: PCT/CN2020/077059
§ 371 (c)(1),
(2) Date: Aug. 29, 2022

(87) PCT Pub. No.: WO2021/168761
PCT Pub. Date: Sep. 2, 2021

(65) Prior Publication Data
US 2023/0111381 A1    Apr. 13, 2023

(51) Int. Cl.
*A61B 17/072*    (2006.01)
*A61B 90/00*    (2016.01)

(52) U.S. Cl.
CPC .. *A61B 17/072* (2013.01); *A61B 2017/07221* (2013.01); *A61B 2017/07271* (2013.01); *A61B 2017/07285* (2013.01); *A61B 2090/0801* (2016.02)

(58) Field of Classification Search
CPC .......... A61B 17/072; A61B 2090/0801; A61B 2017/07271; A61B 2017/07285; A61B 2017/07221
See application file for complete search history.

(56) References Cited

U.S. PATENT DOCUMENTS

| | | | |
|---|---|---|---|
| 1,158,111 | A | 10/1915 | Ahlheim |
| 2,891,250 | A | 6/1959 | Hirata |
| 3,080,564 | A | 3/1963 | Strekopitov et al. |
| 3,252,643 | A | 5/1966 | Strekopov et al. |
| 3,269,630 | A | 8/1966 | Fleischer |
| 3,275,211 | A | 9/1966 | Hirsch et al. |
| 3,315,863 | A | 4/1967 | O'Dea |
| 3,494,533 | A | 2/1970 | Green et al. |

(Continued)

FOREIGN PATENT DOCUMENTS

| | | |
|---|---|---|
| CN | 1689530 A | 11/2005 |
| CN | 1919149 B | 8/2010 |

(Continued)

OTHER PUBLICATIONS

Japanese Office Action dated Nov. 14, 2023, issued in corresponding JP Appln. No. 2022551627, 6 pages.

(Continued)

*Primary Examiner* — Robert F Long
*Assistant Examiner* — Eduardo R Ferrero (57) ABSTRACT

A surgical stapling device includes a cartridge assembly including a staple pusher, a knife holder, a knife supported on the knife holder, and a biasing member. The biasing member is positioned between the staple pusher and the knife holder to prevent re-advancement of the knife blade after the stapling device is fired.

15 Claims, 9 Drawing Sheets

(56) References Cited

U.S. PATENT DOCUMENTS

| | | |
|---|---|---|
| 3,589,589 A | 6/1971 | Akopov |
| 3,692,224 A | 9/1972 | Astafiev et al. |
| 3,795,034 A | 3/1974 | Strekopytov et al. |
| 3,822,818 A | 7/1974 | Strekopytov et al. |
| 3,935,981 A | 2/1976 | Akopov et al. |
| 3,949,923 A | 4/1976 | Akopov et al. |
| 4,047,654 A | 9/1977 | Alvarado |
| 4,216,891 A | 8/1980 | Behlke |
| 4,244,372 A | 1/1981 | Kapitanov et al. |
| 4,296,881 A | 10/1981 | Lee |
| 4,305,539 A | 12/1981 | Korolkov et al. |
| 4,354,628 A | 10/1982 | Green |
| 4,378,901 A | 4/1983 | Akopov et al. |
| 4,383,634 A | 5/1983 | Green |
| 4,402,444 A | 9/1983 | Green |
| 4,415,112 A | 11/1983 | Green |
| D273,513 S | 4/1984 | Spreckelmeier |
| 4,442,964 A | 4/1984 | Becht |
| 4,470,533 A | 9/1984 | Schuler |
| 4,475,679 A | 10/1984 | Fleury, Jr. |
| 4,485,811 A | 12/1984 | Chernousov et al. |
| 4,506,670 A | 3/1985 | Crossley |
| 4,506,671 A | 3/1985 | Green |
| 4,508,253 A | 4/1985 | Green |
| 4,522,327 A | 6/1985 | Korthoff et al. |
| 4,527,724 A | 7/1985 | Chow et al. |
| 4,530,453 A | 7/1985 | Green |
| 4,550,870 A | 11/1985 | Krumme et al. |
| 4,566,620 A | 1/1986 | Green et al. |
| 4,568,009 A | 2/1986 | Green |
| 4,573,622 A | 3/1986 | Green et al. |
| 4,580,712 A | 4/1986 | Green |
| 4,585,153 A | 4/1986 | Failla et al. |
| 4,589,582 A | 5/1986 | Bilotti |
| 4,602,634 A | 7/1986 | Barkley |
| 4,605,001 A | 8/1986 | Rothfuss et al. |
| 4,605,004 A | 8/1986 | Di Giovanni et al. |
| 4,606,344 A | 8/1986 | Di Giovanni |
| 4,606,345 A | 8/1986 | Dorband et al. |
| 4,607,636 A | 8/1986 | Kula et al. |
| 4,612,933 A | 9/1986 | Brinkerhoff et al. |
| 4,617,928 A | 10/1986 | Alfranca |
| 4,632,290 A | 12/1986 | Green et al. |
| 4,665,916 A | 5/1987 | Green |
| 4,684,051 A | 8/1987 | Akopov et al. |
| 4,714,187 A | 12/1987 | Green |
| 4,715,520 A | 12/1987 | Roehr, Jr. et al. |
| 4,728,020 A | 3/1988 | Green et al. |
| 4,767,044 A | 8/1988 | Green |
| 4,788,978 A | 12/1988 | Strekopytov et al. |
| 4,802,614 A | 2/1989 | Green et al. |
| 4,805,823 A | 2/1989 | Rothfuss |
| 4,819,853 A | 4/1989 | Green |
| 4,848,637 A | 7/1989 | Pruitt |
| 4,869,414 A | 9/1989 | Green et al. |
| 4,881,544 A | 11/1989 | Green et al. |
| 4,881,545 A | 11/1989 | Isaacs et al. |
| 4,915,100 A | 4/1990 | Green |
| 4,930,503 A | 6/1990 | Pruitt |
| 4,938,408 A | 7/1990 | Bedi et al. |
| 4,941,623 A | 7/1990 | Pruitt |
| 4,951,861 A | 8/1990 | Schulze et al. |
| 4,964,559 A | 10/1990 | Deniega et al. |
| 5,005,754 A | 4/1991 | Van Overloop |
| 5,018,657 A | 5/1991 | Pedlick et al. |
| 5,071,052 A | 12/1991 | Rodak et al. |
| 5,100,042 A | 3/1992 | Gravener et al. |
| 5,116,349 A | 5/1992 | Aranyi |
| 5,137,198 A | 8/1992 | Nobis et al. |
| 5,172,845 A | 12/1992 | Tejeiro |
| 5,190,203 A | 3/1993 | Rodak |
| 5,219,111 A | 6/1993 | Bilotti et al. |
| 5,240,163 A | 8/1993 | Stein et al. |
| 5,344,060 A | 9/1994 | Gravener et al. |
| 5,368,599 A | 11/1994 | Hirsch et al. |
| 5,405,073 A | 4/1995 | Porter |
| 5,413,267 A | 5/1995 | Solyntjes et al. |
| 5,439,155 A | 8/1995 | Viola |
| 5,452,836 A | 9/1995 | Huitema et al. |
| 5,458,279 A | 10/1995 | Plyley |
| 5,462,215 A | 10/1995 | Viola et al. |
| 5,464,144 A | 11/1995 | Guy et al. |
| 5,465,894 A | 11/1995 | Clark et al. |
| 5,470,006 A | 11/1995 | Rodak |
| 5,470,008 A | 11/1995 | Rodak |
| 5,470,009 A | 11/1995 | Rodak |
| 5,497,934 A | 3/1996 | Brady et al. |
| 5,503,320 A | 4/1996 | Webster et al. |
| 5,509,596 A | 4/1996 | Green et al. |
| 5,542,594 A | 8/1996 | McKean et al. |
| 5,547,117 A | 8/1996 | Hamblin et al. |
| 5,558,266 A | 9/1996 | Green et al. |
| 5,571,285 A | 11/1996 | Chow et al. |
| 5,579,978 A | 12/1996 | Green et al. |
| 5,580,067 A | 12/1996 | Hamblin et al. |
| 5,603,443 A | 2/1997 | Clark et al. |
| 5,605,272 A | 2/1997 | Witt et al. |
| 5,605,273 A | 2/1997 | Hamblin et al. |
| 5,607,094 A | 3/1997 | Clark et al. |
| 5,615,820 A | 4/1997 | Viola |
| 5,641,111 A | 6/1997 | Ahrens et al. |
| 5,678,748 A | 10/1997 | Plyley et al. |
| 5,697,543 A | 12/1997 | Burdorf |
| 5,706,997 A | 1/1998 | Green et al. |
| 5,706,998 A | 1/1998 | Plyley et al. |
| 5,732,871 A | 3/1998 | Clark et al. |
| 5,735,445 A | 4/1998 | Vidal et al. |
| 5,794,834 A | 8/1998 | Hamblin et al. |
| 5,810,240 A | 9/1998 | Robertson |
| 5,855,311 A | 1/1999 | Hamblin et al. |
| 5,878,937 A | 3/1999 | Green et al. |
| 5,893,506 A | 4/1999 | Powell |
| 5,894,979 A | 4/1999 | Powell |
| 5,964,394 A | 10/1999 | Robertson |
| 6,045,560 A | 4/2000 | McKean et al. |
| 6,638,285 B2 | 10/2003 | Gabbay |
| 6,805,273 B2 | 10/2004 | Bilotti et al. |
| 6,817,508 B1 * | 11/2004 | Racenet .............. A61B 17/072 227/176.1 |
| 6,988,650 B2 | 1/2006 | Schwemberger et al. |
| 7,070,083 B2 | 7/2006 | Jankowski |
| 7,134,587 B2 | 11/2006 | Schwemberger et al. |
| 7,147,139 B2 | 12/2006 | Schwemberger et al. |
| 7,147,140 B2 | 12/2006 | Wukusick et al. |
| 7,204,404 B2 | 4/2007 | Nguyen et al. |
| 7,207,472 B2 | 4/2007 | Wukusick et al. |
| 7,210,609 B2 | 5/2007 | Leiboff et al. |
| 7,237,708 B1 | 7/2007 | Guy et al. |
| 7,275,674 B2 | 10/2007 | Racenet et al. |
| RE40,237 E | 4/2008 | Bilotti et al. |
| 7,407,076 B2 | 8/2008 | Racenet et al. |
| 7,431,190 B2 | 10/2008 | Hoffman |
| 7,522,854 B2 | 4/2009 | Kinouchi et al. |
| 7,549,563 B2 | 6/2009 | Mather et al. |
| 7,568,605 B2 | 8/2009 | Kruszynski |
| 7,641,092 B2 | 1/2010 | Kruszynski et al. |
| 7,717,312 B2 | 5/2010 | Beetel |
| 7,731,073 B2 | 6/2010 | Wixey et al. |
| 7,735,704 B2 | 6/2010 | Bilotti |
| 7,766,207 B2 | 8/2010 | Mather et al. |
| 7,810,690 B2 | 10/2010 | Bilotti et al. |
| 7,828,188 B2 | 11/2010 | Jankowski |
| 7,886,953 B2 | 2/2011 | Schwemberger et al. |
| 8,016,176 B2 | 9/2011 | Kasvikis et al. |
| 8,029,520 B2 | 10/2011 | Korvick et al. |
| 8,033,439 B2 | 10/2011 | Racenet et al. |
| 8,070,038 B2 | 12/2011 | Kostrzewski |
| 8,231,041 B2 | 7/2012 | Marczyk et al. |
| 8,292,904 B2 | 10/2012 | Popovic et al. |
| 8,328,064 B2 | 12/2012 | Racenet et al. |
| 8,360,296 B2 | 1/2013 | Zingman |
| 8,424,738 B2 | 4/2013 | Kasvikis |
| 8,499,994 B2 | 8/2013 | D'Arcangelo |
| 8,596,515 B2 | 12/2013 | Okoniewski |

(56) References Cited

U.S. PATENT DOCUMENTS

| | | |
|---|---|---|
| 8,627,994 B2 | 1/2014 | Zemlok et al. |
| 8,646,673 B2 | 2/2014 | Bilotti et al. |
| 8,757,467 B2 | 6/2014 | Racenet et al. |
| 8,936,185 B2 | 1/2015 | Racenet et al. |
| 8,955,732 B2 | 2/2015 | Zemlok et al. |
| 8,967,446 B2 | 3/2015 | Beardsley et al. |
| 9,022,273 B1 | 5/2015 | Marczyk et al. |
| 9,125,651 B2 | 9/2015 | Mandakolathur Vasudevan et al. |
| 9,192,382 B2 | 11/2015 | Kostrzewski |
| 9,192,387 B1 | 11/2015 | Holsten et al. |
| 9,480,474 B2 | 11/2016 | Ji et al. |
| 9,566,066 B2 | 2/2017 | Kasvikis |
| 9,579,102 B2 | 2/2017 | Holsten et al. |
| 9,655,619 B2 | 5/2017 | Zhang et al. |
| 9,662,111 B2 | 5/2017 | Holsten et al. |
| 9,668,736 B2 | 6/2017 | Holsten et al. |
| 9,675,349 B2 | 6/2017 | Holsten et al. |
| 9,675,350 B2 | 6/2017 | Holsten et al. |
| 9,675,356 B2 | 6/2017 | Racenet et al. |
| 9,814,460 B2 | 11/2017 | Kimsey et al. |
| 9,888,923 B2 | 2/2018 | Chen et al. |
| 9,962,159 B2 | 5/2018 | Heinrich et al. |
| 10,004,504 B2 | 6/2018 | Bryant |
| 10,085,754 B2 | 10/2018 | Sniffin et al. |
| 10,194,913 B2 | 2/2019 | Nalagatla et al. |
| 2004/164123 A1 | 8/2004 | Racenet et al. |
| 2005/0247752 A1 | 11/2005 | Kelly et al. |
| 2005/0247753 A1 | 11/2005 | Kelly et al. |
| 2006/0163312 A1 | 7/2006 | Viola et al. |
| 2007/0187456 A1 | 8/2007 | Viola et al. |
| 2008/0167670 A1 | 7/2008 | Shelton et al. |
| 2010/0048988 A1 | 2/2010 | Pastorelli et al. |
| 2013/0098966 A1 | 4/2013 | Kostrzewski et al. |
| 2013/0206813 A1 | 8/2013 | Nalagatla |
| 2013/0313305 A1 | 11/2013 | Scirica et al. |
| 2016/0249914 A1 | 9/2016 | Zhang et al. |
| 2016/0249923 A1 | 9/2016 | Hodgkinson et al. |
| 2016/0270784 A1 | 9/2016 | Wheeler et al. |
| 2016/0270790 A1 | 9/2016 | Jankowski |
| 2016/0270793 A1 | 9/2016 | Carter et al. |
| 2016/0278779 A1 | 9/2016 | Jankowski |
| 2017/0014134 A1 | 1/2017 | Chen et al. |
| 2017/0027571 A1 | 2/2017 | Nalagatla et al. |
| 2017/0027572 A1 | 2/2017 | Nalagatla et al. |
| 2017/0027573 A1 | 2/2017 | Nalagatla et al. |
| 2017/0027574 A1 | 2/2017 | Nalagatla et al. |
| 2017/0128149 A1 | 5/2017 | Heinrich et al. |
| 2017/0238923 A1 | 8/2017 | Holsten et al. |
| 2017/0238924 A1 | 8/2017 | Holsten et al. |
| 2017/0265861 A1 | 9/2017 | Holsten et al. |
| 2018/0008261 A1 | 1/2018 | Racenet et al. |
| 2018/0049739 A1 | 2/2018 | Kasvikis |
| 2018/0153544 A1 | 6/2018 | Maddur Shankarsetty et al. |
| 2018/0221024 A1 | 8/2018 | Heinrich et al. |

FOREIGN PATENT DOCUMENTS

| | | |
|---|---|---|
| CN | 101912284 B | 7/2012 |
| CN | 102599954 B | 3/2014 |
| CN | 204016394 U | 12/2014 |
| CN | 207186650 U | 4/2018 |
| EP | 3329862 B1 | 4/2021 |
| JP | 2007050260 A | 3/2007 |
| JP | 2010259792 A | 11/2010 |
| JP | 2015509393 A | 3/2015 |
| WO | 2021081984 A1 | 5/2021 |

OTHER PUBLICATIONS

Extended European Search Report dated Oct. 30, 2023, issued in corresponding EP Appln. No. 20921503, 11 pages.
International Search Report for Application No. PCT/CN2020/077059 dated Nov. 30, 2020.
Written Opinion for Application No. PCT/CN2020/077059 dated Nov. 30, 2020.

* cited by examiner

STAPLE CARTRIDGE WITH RETRACTABLE KNIFE ASSEMBLY

FIELD

This technology is generally related to surgical stapling devices and, more particularly, to surgical stapling devices with retractable knife assemblies.

BACKGROUND

Surgical stapling devices are commonly used during a variety of surgical procedures to expedite dissection and suturing of tissue and minimize trauma to a patient. Typically, these stapling devices include a cartridge assembly that includes a staple cartridge that can be replaced after each use of the stapling device to facilitate reuse of the stapling device. The cartridge assembly includes a knife assembly having a knife blade that is moveable between a retracted position and an advanced position to cut tissue. After the stapling device is fired and tissue is cut, the knife blade is retracted into the cartridge assembly to shield a clinician from the knife blade during removal and disposal of the cartridge assembly.

A continuing need exists in the art for a stapling device that includes a cartridge assembly including structure to retain the knife blade in a retracted and shielded position after the stapling device is fired.

SUMMARY

Aspects of this disclosure are directed to a surgical stapling device having a cartridge assembly including a staple pusher, a knife holder, a knife supported on the knife holder, and a biasing member. The biasing member is positioned between the staple pusher and the knife holder to prevent re-advancement of the knife blade after the stapling device is fired.

One aspect of this disclosure is directed to a cartridge assembly including a cartridge body, a plurality of staples, a staple pusher, a knife holder, a knife, and a biasing member. The cartridge body defines a cavity, a knife slot, a plurality of staple pockets, and a tissue engaging surface. The knife slot and the plurality of staple pockets extend between the tissue engaging surface and the cavity. Each of the plurality of staples is received within one of the plurality of staple pockets. The staple pusher is supported within the cavity of the cartridge body and is movable from a retracted position to an advanced position to eject the plurality of staples from the plurality of staple pockets of the cartridge body. The knife holder supports the knife blade, and is positioned within the cavity of the cartridge body. The knife holder is movable between a retracted position and an advanced position to move the knife blade from a retracted position recessed within the cartridge body to an advanced position extending from the knife slot. The biasing member is positioned between the knife holder and the staple pusher within the cartridge body and is configured to urge the knife holder and the knife blade towards their retracted positions.

Another aspect of the disclosure is directed to a cartridge assembly including a cartridge body, a plurality of staples, a staple pusher, a knife holder, and a biasing member. The cartridge body defines a cavity, a knife slot, a plurality of staple pockets, and a tissue engaging surface. The knife slot and the plurality of staple pockets extend between the tissue engaging surface and the cavity. Each of the plurality of staples is received within one of the plurality of staple pockets. The staple pusher is supported within the cavity of the cartridge body and is movable from a retracted position to an advanced position to eject the plurality of staples from the plurality of staple pockets of the cartridge body. The knife holder supports the knife blade and is positioned within the cavity of the cartridge body. The knife holder is movable between a retracted position and an advanced position to move the knife blade from a retracted position recessed within the cartridge body to an advanced position extending from the knife slot. The biasing member is positioned between the knife holder and the staple pusher and includes first and second spring arms. The first spring arm is engaged with the knife holder and the second spring arm is engaged with the staple pusher to urge the knife holder and the knife blade towards their retracted positions. The second spring arm includes a ring member that is engaged with the staple pusher. The ring member is positioned between the staple pusher and the knife holder when the staple pusher is in its advanced position and the knife holder is in its retracted position.

Another aspect of the disclosure is directed to a surgical stapling device including a handle assembly, a frame, an anvil, a clamp slide assembly, and a cartridge assembly. The frame includes a U-shaped distal frame portion that includes a first transverse portion, a second transverse portion, and a longitudinal portion connecting the first transverse portion and the second transverse portion. The first and second transverse portions define a gap. The anvil is supported on the first transverse portion of the distal frame portion of the frame. The clamp slide assembly includes a distal cartridge support positioned within the gap. The cartridge assembly includes a cartridge body, a plurality of staples, a staple pusher, a knife holder, a knife, and a biasing member. The cartridge body defines a cavity, a knife slot, a plurality of staple pockets, and a tissue engaging surface. The knife slot and the plurality of staple pockets extend between the tissue engaging surface and the cavity. Each of the plurality of staples is received within one of the plurality of staple pockets. The staple pusher is supported within the cavity of the cartridge body and is movable from a retracted position to an advanced position to eject the plurality of staples from the plurality of staple pockets of the cartridge body. The knife holder supports the knife blade, and is positioned within the cavity of the cartridge body. The knife holder is movable between a retracted position and an advanced position to move the knife blade from a retracted position recessed within the cartridge body to an advanced position extending from the knife slot. The biasing member is positioned between the knife holder and the staple pusher within the cartridge body and is configured to urge the knife holder and the knife blade towards their retracted positions.

In aspects of the disclosure, the knife holder defines a recess, and the biasing member is received within the recess when the knife holder and the staple pusher are in their retracted positions.

In some aspects of the disclosure, the biasing member includes a first spring arm engaged with the knife holder and a second spring arm engaged with the staple pusher.

In certain aspects of the disclosure, the first spring arm includes a first ring member engaged with the knife holder and the second spring arm includes a second ring member engaged with the staple pusher.

In aspects of the disclosure, the second spring arm is longitudinally misaligned with the recess when the staple pusher is in its advanced position and the knife holder is in its retracted position.

In some aspects of the disclosure, the biasing member includes a torsion spring.

In certain aspects of the disclosure, the torsion spring includes a central coil positioned between the first and second spring arms.

In aspects of the disclosure, the cartridge body includes a post positioned with the recess that is received within the central coil of the torsion spring.

In some aspects of the disclosure, the second spring arm includes a ring member that is engaged with the staple pusher and is positioned within the recess when the staple pusher and knife holder are in their retracted positions and positioned between the staple pusher and the knife holder misaligned with the recess when the staple pusher is in its advanced position and the knife holder is in its retracted position.

In certain aspects of the disclosure, the ring member has a diameter to prevent advancement of the knife blade from the knife slot when the ring member is misaligned with the recess.

In aspects of the disclosure, the biasing member includes a leaf spring.

In some aspects of the disclosure, the leaf spring includes a bend defined between the first and second spring arms.

Other features of the disclosure will be appreciated from the following description.

BRIEF DESCRIPTION OF THE DRAWINGS

Various aspects of the disclosure are described herein below with reference to the drawings, wherein.

DETAILED DESCRIPTION

The disclosed cartridge assembly will now be described in detail with reference to the drawings in which like reference numerals designate identical or corresponding elements in each of the several views. However, it is to be understood that the aspects of the disclosure are merely exemplary of the disclosure and may be embodied in various forms. Well-known functions or constructions are not described in detail to avoid obscuring the disclosure in unnecessary detail. Therefore, specific structural and functional details disclosed herein are not to be interpreted as limiting, but merely as a basis for the claims and as a representative basis for teaching one skilled in the art to variously employ the disclosure in virtually any appropriately detailed structure. In addition, directional terms such as front, rear, upper, lower, top, bottom, distal, proximal, and similar terms are used to assist in understanding the description and are not intended to limit the disclosure.

In this description, the term "proximal" is used generally to refer to that portion of the device that is closer to a clinician during customary usage of the device, while the term "distal" is used generally to refer to that portion of the device that is farther from the clinician during customary usage of the device. In addition, the term "clinician" is used generally to refer to medical personnel including doctors, nurses, and support personnel.

Figure 1:
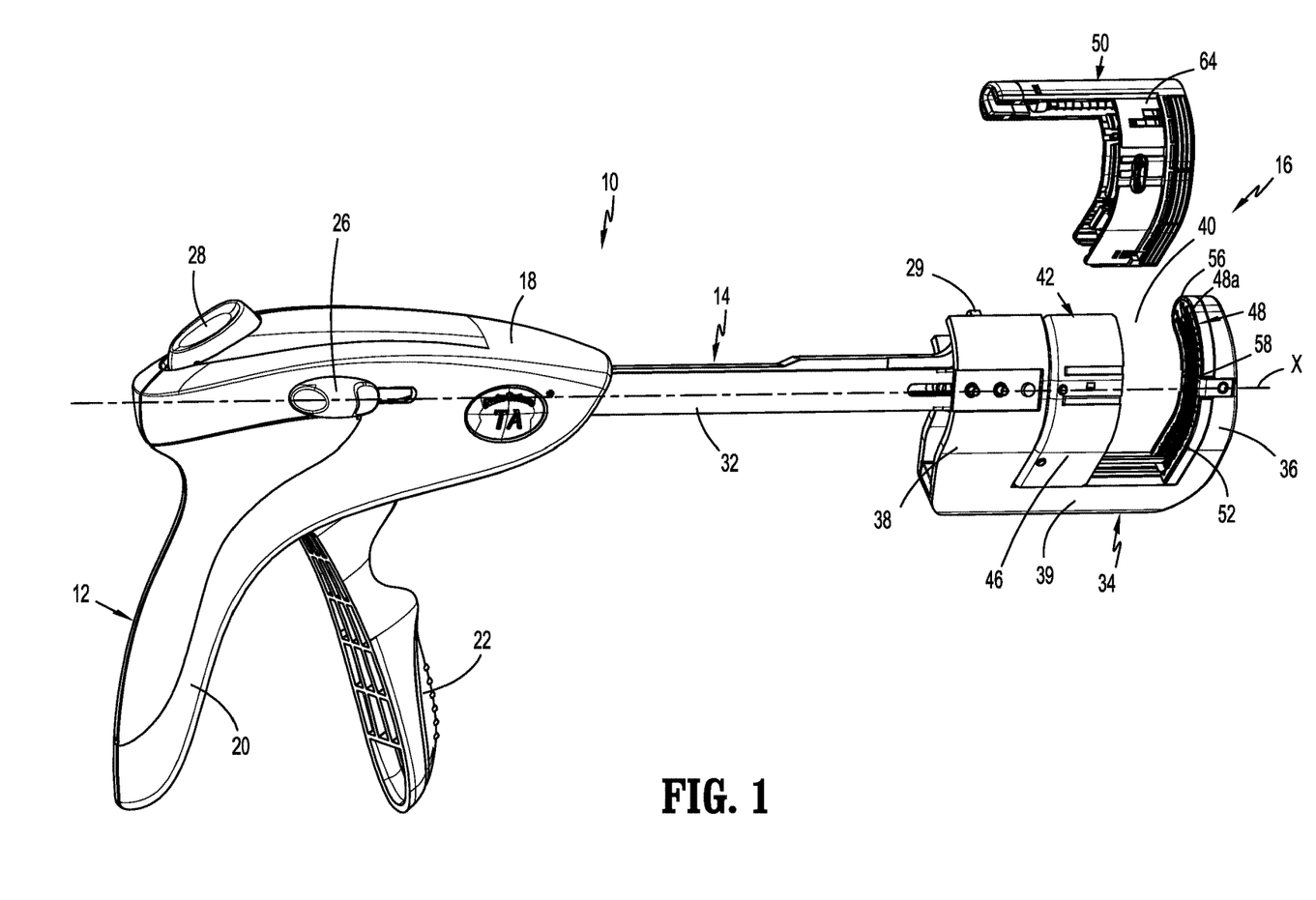
FIG. 1 is a side perspective view of a surgical stapling device including a cartridge assembly according to aspects of the disclosure with the cartridge assembly separated from a clamp slide assembly of the surgical stapling device.
Figure 2:
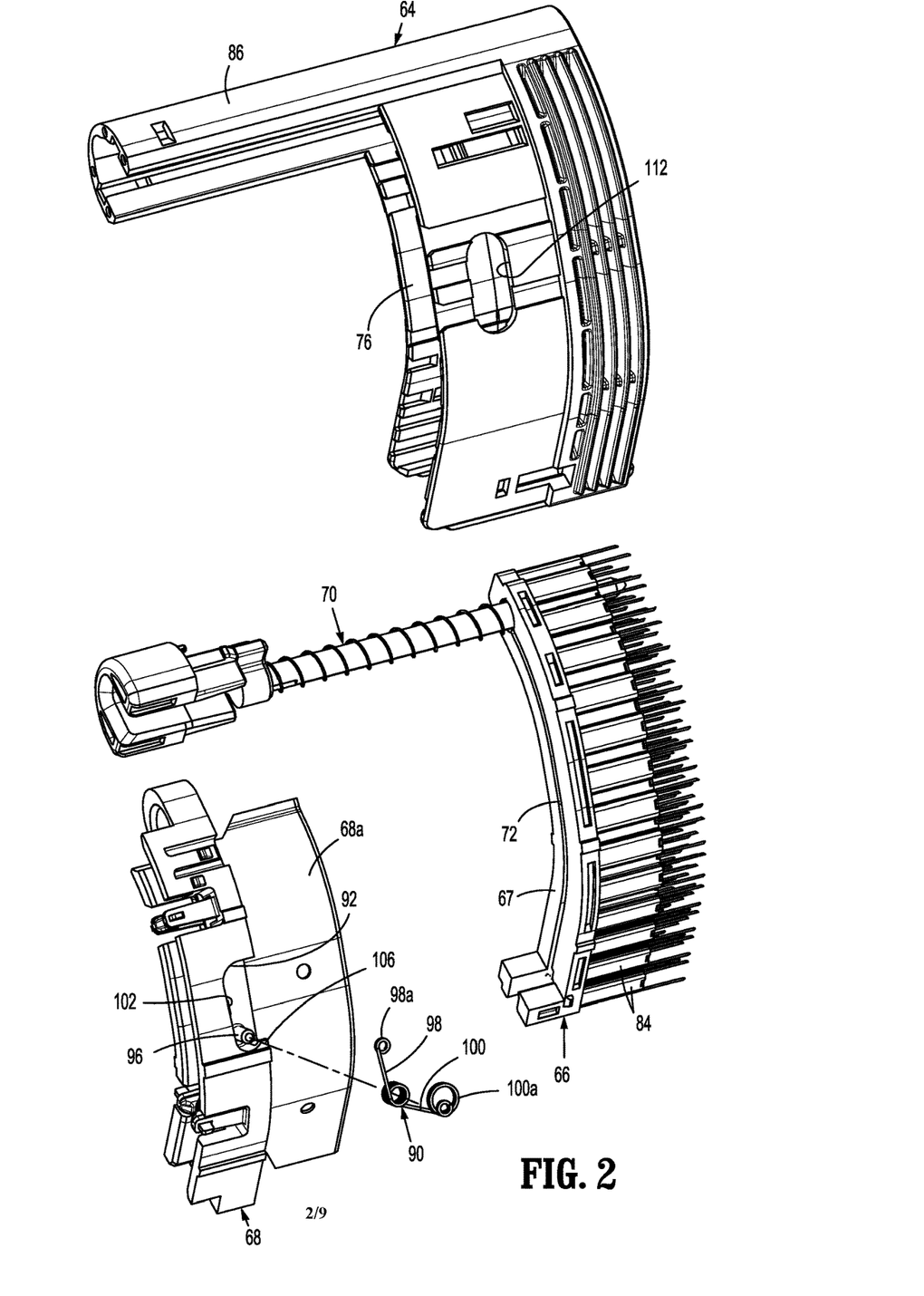
FIG. 2 is a side perspective, exploded view of the cartridge assembly shown in FIG. 1.
Figure 3:
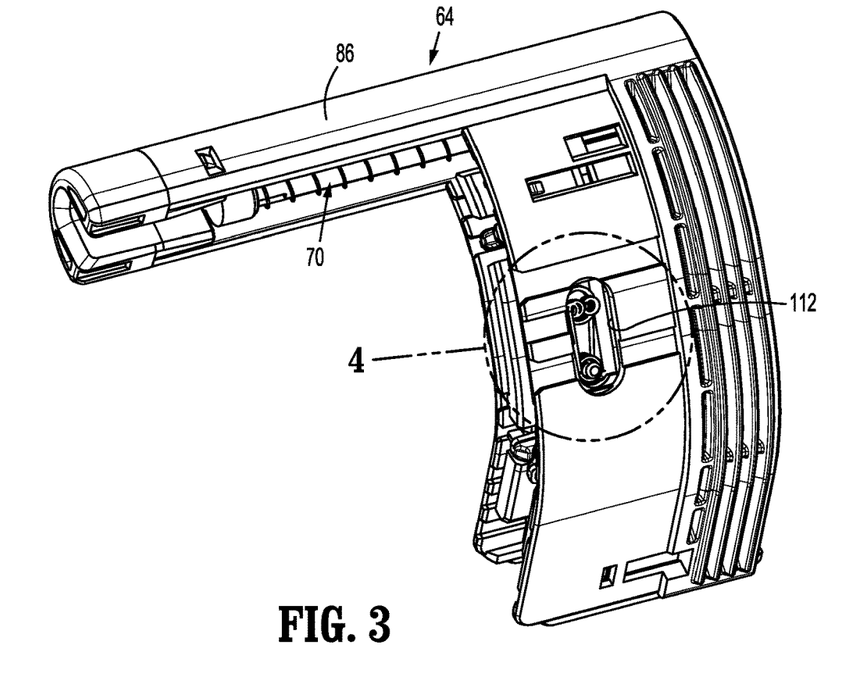
FIG. 3 is a side perspective view of the cartridge assembly of the surgical stapling device shown in FIG. 1.

FIGS. 1-3 illustrate the disclosed surgical stapling device shown generally as stapling device 10. The stapling device 10 includes a handle assembly 12, an elongate body 14 that extends distally from the handle assembly 12, and a tool assembly 16 that is supported on a distal portion of the elongate body 14. The elongate body 14 defines a longitudinal axis "X" (FIG. 1). The handle assembly 12 includes a housing 18 that defines a stationary handle 20 and supports a movable trigger 22. In aspects of the disclosure, the movable trigger 22 is supported by the housing 18 to pivot towards the stationary handle 20 between non-actuated and actuated positions to operate the tool assembly 16. The handle assembly 12 supports a button 26 on each side of the housing 18 (only one is shown) that is movable along the housing 18 to advance and retract an alignment pin pusher 29 (FIG. 3). The handle assembly 12 also includes a release button 28 that can be depressed to move the tool assembly 16 from a clamped position to an unclamped position. For a more detailed description of a suitable handle assembly 12, see, e.g., U.S. Pat. No. 6,817,508 ("the '508 Patent").

The stapling device 10 includes a frame 32 (FIG. 1) that extends from the handle assembly 12 to the tool assembly 16. The frame 32 includes a distal frame portion 34 that has a U-shaped configuration. The distal frame portion 34 (FIG. 3) has a first transverse portion 36, a second transverse portion 38, and a longitudinal portion 39 that interconnects the first transverse portion 36 and the second transverse portion 38. The first and second transverse portions 36 and 38 are spaced from each other to define a gap 40 that extends between the first and second transverse portions 36 and 38. In some aspects of the disclosure, the first and second transverse portions 36 and 38 are curved along axes transverse to the longitudinal axis "X" of the elongate body 14 of the stapling device 10. Alternately, the first and second transverse portions 36 and 38 can be linear or comprised of a plurality of linear portions that are positioned at angles in relation to each other.

The stapling device 10 includes a clamp slide assembly 42 (FIG. 1) that has a distal cartridge support 46 positioned within the gap 40 of the distal frame portion 34 and a proximal portion that is coupled to the handle assembly 12. The clamp slide assembly 42 is movable between retracted and advanced positions in response to actuation of the movable trigger 22.

The tool assembly 16 includes an anvil assembly 48 and a cartridge assembly 50. The anvil assembly 48 is secured to the first transverse portion 36 of the distal frame portion 34 of the frame 32 and includes an anvil 48a (FIG. 1) having a staple deforming surface 52. The staple deforming surface 52 defines an upper opening 56 and a surface knife slot 58.

Figure 4:
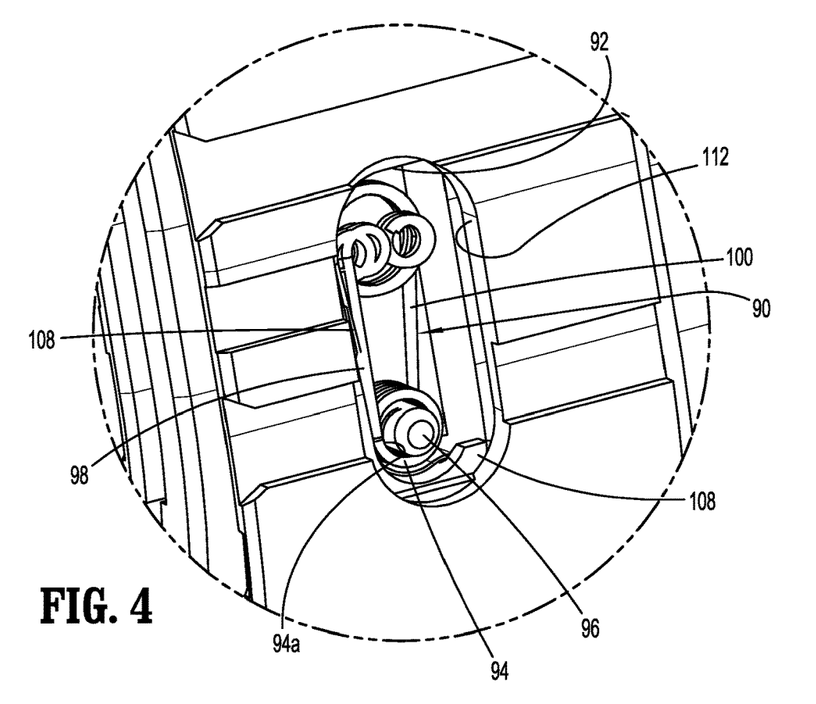
FIG. 4 is an enlarged view of the indicated area of detail shown in FIG. 3.
Figure 8:
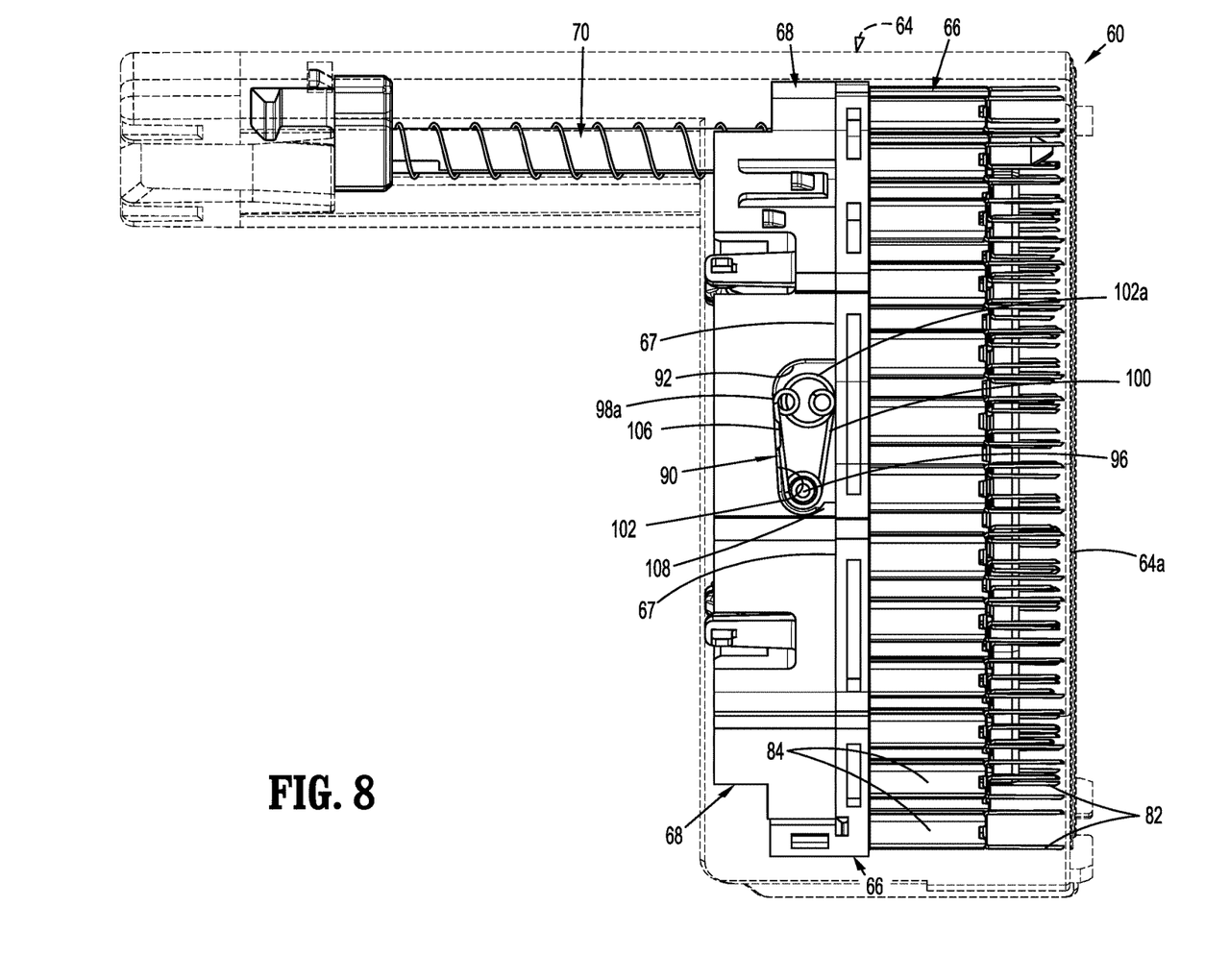
FIG. 8 is a side view of the cartridge assembly shown in FIG. 2 in a pre-fired state with a cartridge body of the cartridge assembly shown in phantom.

FIGS. 2-4 illustrate the cartridge assembly 50 which is removably supported on the distal cartridge support 46 of the clamp slide assembly 42. The cartridge assembly 50 includes a cartridge body 64, a staple pusher 66, a knife holder 68, and an alignment pin 70. The cartridge body 64 defines a cavity 76 (FIG. 2), a tissue engaging surface 64a (FIG. 8), a knife slot 78 (FIG. 10), a plurality of staple pockets 80 (FIG. 10), and a plurality of staples 82 (FIG. 8). The knife slot 78 and the staple pockets 80 extend through the tissue engaging surface 64a of the cartridge body 64 and communicate with the cavity 76. The cavity 76 receives the staple pusher 66 and the knife holder 68 for movement between retracted and advanced positions. The staple pusher 66 defines a knife slot 72 and includes fingers 84. The fingers 84 are received within the staple pockets 80 (FIG. 10) such that movement of the staple pusher 80 from its retracted position to its advanced position ejects the staples 82 from the staple pockets 80.

The cartridge assembly 60 includes a knife blade 68a (FIG. 2) that is secured to the knife holder 68 and is aligned with the knife slot 78 (FIG. 10) in the cartridge body 64 and with the knife slot 72 in the staple pusher 66. The knife holder 68 is movable from a retracted positon to an advanced position within the cavity 76 (FIG. 2) of the cartridge body 64 to move the knife blade 68a through the knife slot 72 of the staple pusher 66 from a retracted position shielded within the cartridge body 64 to an advanced position projecting from the knife slot 78 of the cartridge body 64. The cartridge body 64 also includes proximal extension 86 (FIG. 2) that receives and encloses the alignment pin 70. The alignment pin 70, as known in the art, is movable from a retracted position within the proximal extension 86 to an advanced position engaged within the opening 56 in the anvil 48a of the anvil assembly 48 to confine tissue within the gap 40 of the distal frame portion 34.

FIGS. 2-8 illustrate the cartridge assembly 50 including a biasing member 90. The biasing member 90 is supported on the knife holder 68 between the knife holder 68 and a proximal side of the staple pusher 66 (FIG. 8). In aspects of the disclosure, the knife holder 68 defines a recess 92 that receives the biasing member 90 and the biasing member 90 includes a torsion spring that has a central coil 94. The cartridge body 64 includes a post 96 that is positioned within the recess 92. The central coil 94 defines a bore 94a that receives the post 92 such that the central coil 94 is positioned about the post 92 to secure the torsion spring 90 within the recess 92. The torsion spring 90 includes two spring arms 98 and 100. The first spring arm 98 is engaged with a wall 102 (FIG. 2) of the knife holder 68 that defines the recess 92. The second spring arm 100 is engaged with the proximal portion 67 of the staple pusher 66. In aspects of the disclosure, the end of each of the spring arms 98 and 100 includes a ring 98a and 100a, respectively. The ring members 98a and 100a provide a grasping surface to simplify loading of the torsion spring 90 into the cartridge assembly 50 during assembly of the cartridge assembly 50. The ring members 98a and 100a also provide a smooth surface for engaging the knife holder 68 and the staple pusher 66, respectively. In some aspects of the disclosure, one of the ring members 100a has a diameter that is larger than the other ring member 98a. The larger ring member 100a is acts as a spacer between the knife holder 68 and the staple pusher 66 when large loads are applied to the knife holder 68. More specifically, the larger ring member 100a has a diameter that is large enough to prevent the knife blade 86 from projecting through the knife slot 78 in the cartridge body 64 when the larger ring member 100a is positioned between the knife holder 68 and the staple pusher 66 and the staple pusher 66 is in its advanced position. The knife holder 68 includes stoppers 106 and 108 (FIG. 8) that hang over the recess 92 to retain the torsion spring 90 within the recess 92.

Figure 5:
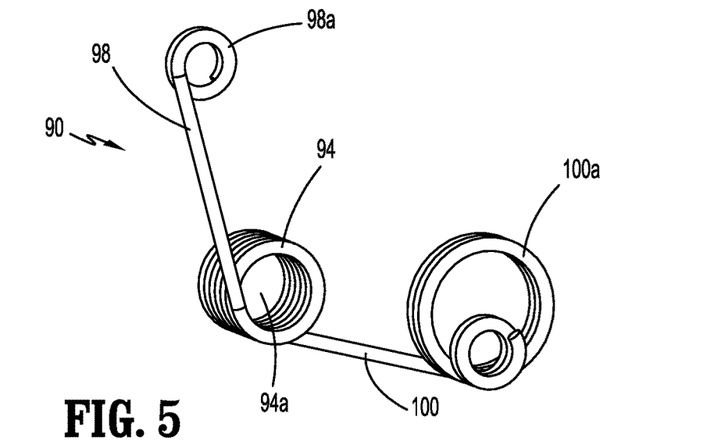
FIG. 5 is a side perspective view of a biasing member of the cartridge assembly shown in FIG. 4 in an unbiased state.
Figure 6:
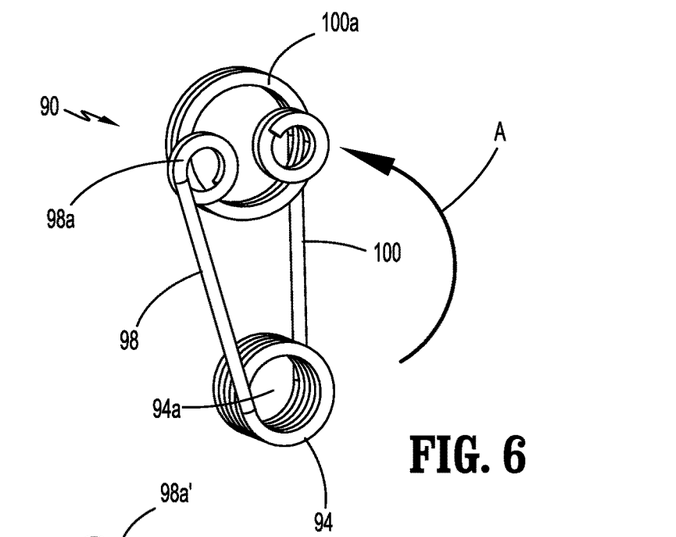
FIG. 6 is a side perspective view of the biasing member shown in FIG. 5 in an installed state.

In its unbiased state, the ring members 98a and 100a are spaced from each other as shown in FIG. 5. In a compressed state, i.e., when the biasing member 90 is compressed between the knife holder 68 and the staple pusher 66, the second spring arm 100 is deformed towards the first spring arm 98 in the direction indicated by arrow "A" in FIG. 6.

Figure 7:
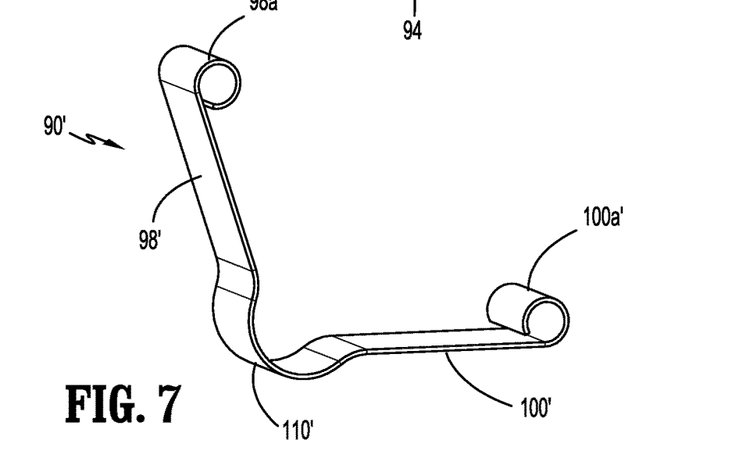
FIG. 7 is a side perspective view of an alternate version of the biasing member shown in FIG. 6 in the unbiased state.

Although the biasing member 90 is illustrated as a torsion spring 90 in FIGS. 2-6, it is envisioned that the biasing member 90 could be formed to have a variety of different spring configurations and of different spring types. For example, the biasing member can be formed as a leaf spring 90' as shown in FIG. 7. The leaf spring 90' includes a first and second spring arms 98' and 100'. Each of the spring arms 98' and 100' includes a ring member 98a' and 100a', respectively. The spring arms 98a' and 100a' function in the same manner as the ring members 98a and 100a (FIG. 6) described above. A bend or curved portion 110' is positioned between the first and second spring arms 98' and 100'. The bend 110' gives the leaf spring 90' a greater degree of flexibility.

FIGS. 2 and 3 illustrate the cartridge body 64 which defines an elongate window 112 that is aligned with the recess 92 in the knife holder 68 when the knife holder 68 is in its retracted position. The window 112 allows the biasing member 90 to be compressed and inserted into the recess 92 in the knife holder 68. The biasing member 90 must be compressed sufficiently to allow the spring arms 98 and 100 to pass by the stoppers 106 and 108 (FIG. 8). When the biasing member 90 passes by the stoppers 106 and 108, the spring arms 98 and 100 move to a position beneath the stoppers 106 and 108 to prevent the biasing member 90 from falling from the recess 92.

FIG. 8 illustrates the cartridge assembly 60 in a pre-fired position. In the pre-fired position, the knife holder 68 and the staple pusher 66 are in their retracted positions within the cartridge body 64. In their retracted positions, the biasing member 90 is compressed between the proximal portion 67 of the staple pusher 66 and the wall 102 of the knife holder 68 with the ring member 98a of the first spring arm 98 engaged with the knife holder 68 and the ring member 100a of the second spring arm 100 engaged with the staple pusher 66. The fingers 84 of the staple pusher 66 are aligned with the staples 82 in the staple pockets 80 of the cartridge body 64 and the knife blade 68a is recessed within the knife slot 78 (FIG. 10) of the cartridge body 64.

Figure 8A:
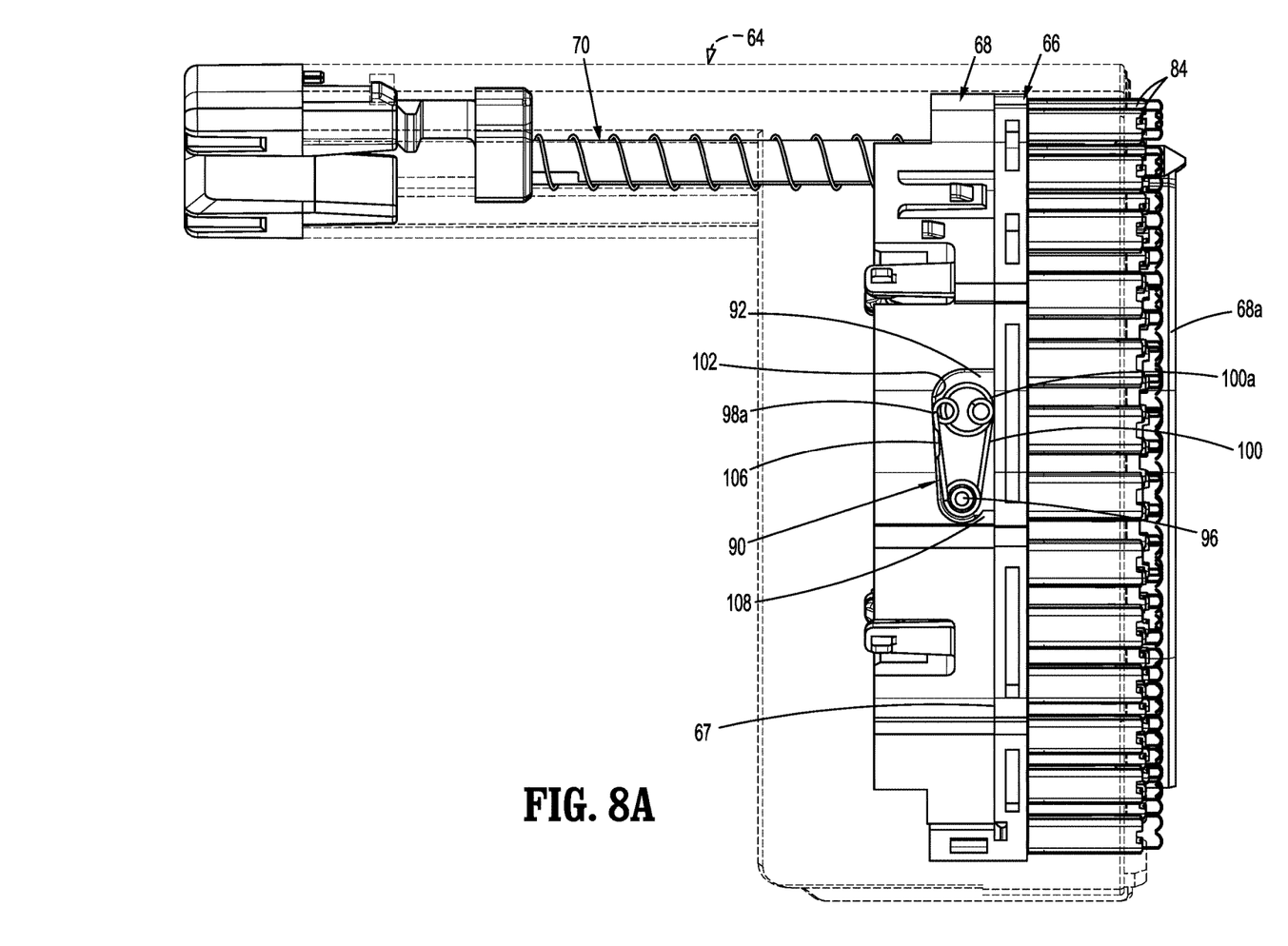
FIG. 8A is a side view of the cartridge assembly shown in FIG. 2 in a fired state with a staple pusher and a knife holder in advanced positions and a cartridge body of the cartridge assembly shown in phantom.

FIG. 8A illustrates the cartridge assembly 50 after the stapling device 10 (FIG. 1) is fired and the knife holder 68 and the staple pusher 66 in their advanced positions. When the cartridge assembly 50 is fired to move the knife holder 68 and the staple cartridge 66 to their to the advanced positions within the cartridge body 64, the knife holder 68 engages the staple pusher 66 and pushes the staple pusher 66 to its advanced position as the knife holder 68 moves to its advanced position. As the staple pusher 66 moves to its advanced position, the fingers 84 move through the staple pockets 80 of the cartridge body 64 to eject the staples 82 from the staple pockets 80. As the knife holder 68 is moved to its advanced position, the knife blade 68*a* moves through the knife slot 78 and extends from the cartridge body 64 into the anvil assembly 48 (FIG. 1) to cut tissue clamped between the anvil assembly 48 and the cartridge assembly 50.

Figure 9:
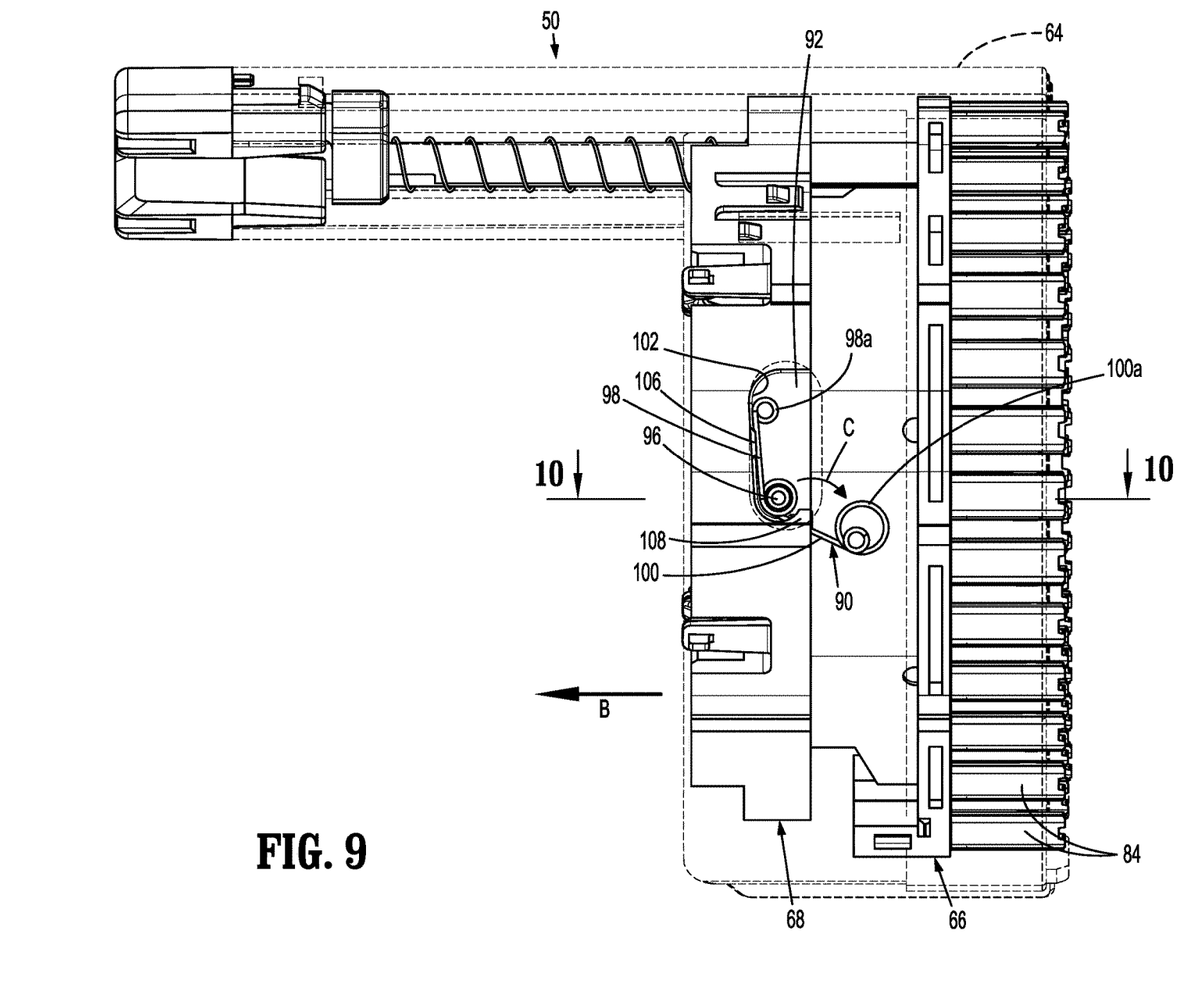
FIG. 9 is a side view of the cartridge assembly shown in FIG. 2 in a post-fired and retracted state with a cartridge body of the cartridge assembly shown in phantom.
Figure 10:
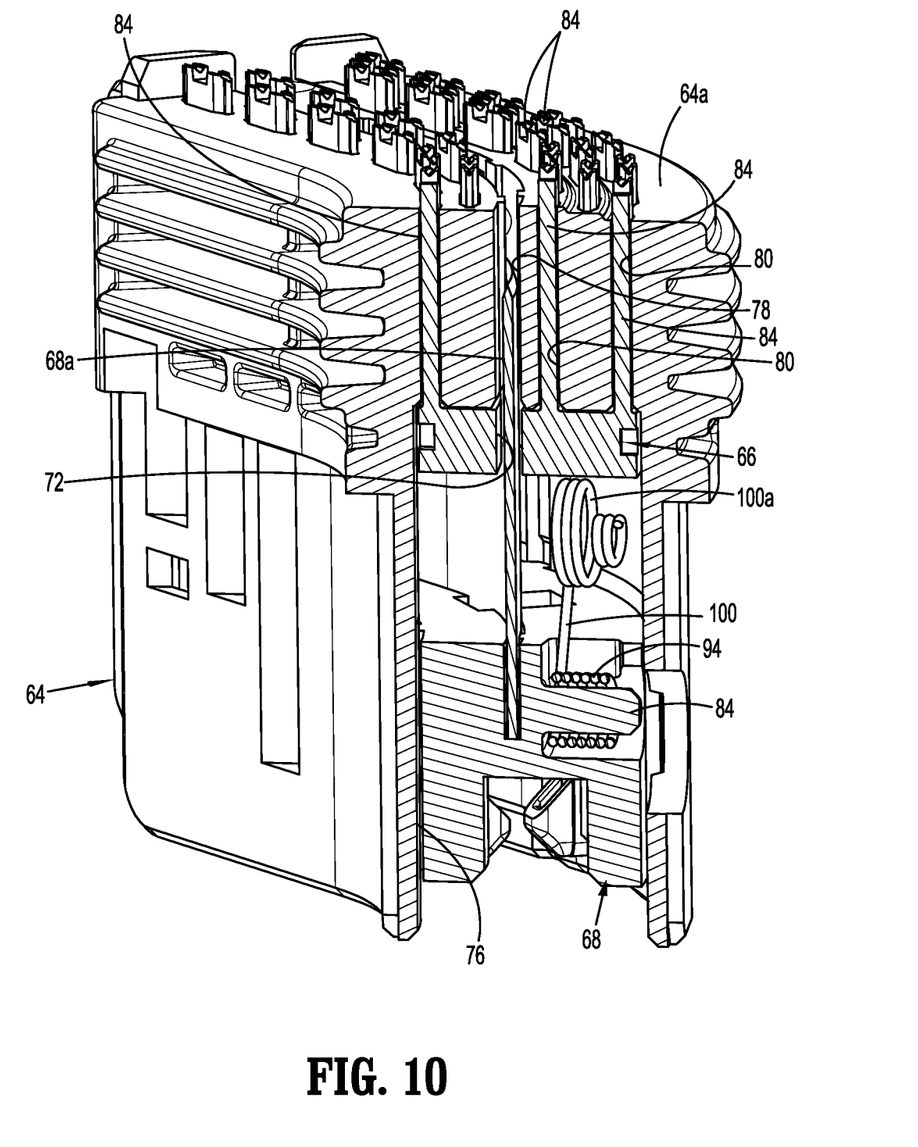
FIG. 10 is a cross-sectional view taken along section line 10-10 of FIG. 9.

FIGS. 9 and 10 illustrate the cartridge assembly 50 after the cartridge assembly 50 is fired and the knife holder 68 is retracted. When the knife holder 68 is retracted in the direction of arrow "B" in FIG. 9, the staple pusher 66 remains in its advanced position with the fingers 84 positioned within the staple pockets 80 (FIG. 10) of the cartridge body 64 and the knife blade 68*a* is retracted into the knife slot 78 of the cartridge body 64. As the knife holder 68 moves proximally in relation to the staple pusher 66, the second spring arm 100 springs outwardly in the direction of arrow "C" in FIG. 9 such that the ring member 100*a* of the second spring arm 100 remains engaged with the staple pusher 66 until the knife holder 68 nears its fully retracted position. In the fully retracted position of the knife holder 68, the ring member 100*a* of the spring arm 100 is spaced from the staple pusher 66. As the knife holder 68 moves proximally in relation to the staple pusher 66, the spring arm 98*a* remains engaged with the knife holder 68. In this position, the second spring arm 100 moves from within the recess 92 in the knife holder 68 to a position laterally offset from the recess 92 and the biasing member 90 obstructs advancement of the knife holder 68 within the cartridge body 64 to prevent the knife blade 68*a* from becoming re-exposed.

Figure 11:
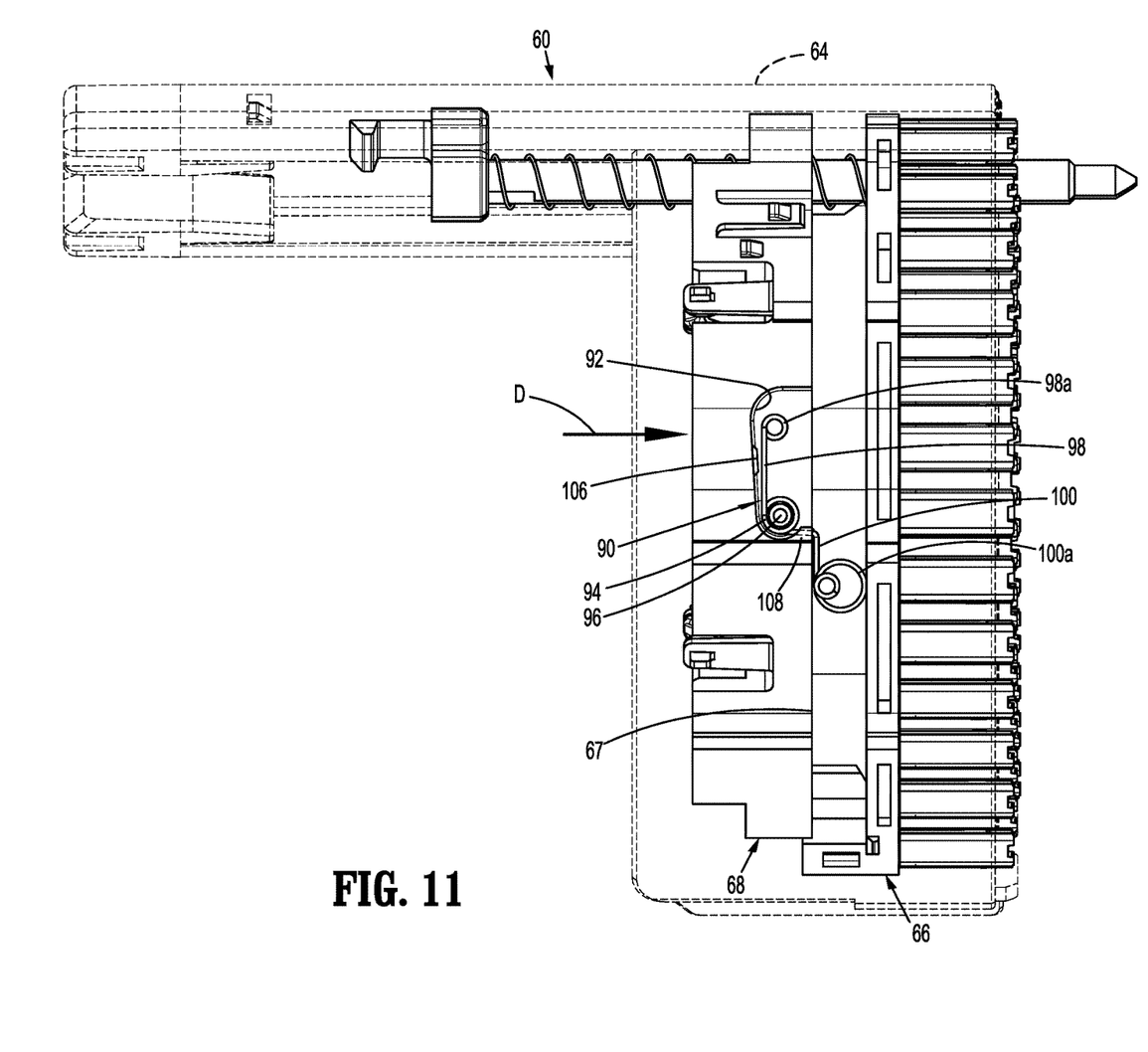
FIG. 11 is a side view of the cartridge assembly shown in FIG. 2 in a post-fired and retracted state with a cartridge body of the cartridge assembly shown in phantom and a force being applied to a knife assembly of the cartridge assembly in a distal direction.

FIG. 11 illustrates the cartridge assembly 50 after the cartridge assembly 50 is fired and the knife holder 68 is retracted as a force is applied to the knife holder 68 in the distal direction indicated by arrow "D" to move the knife holder 68 and knife blade 68*a* towards its advanced position. When a sufficient force is applied to the knife holder 68 to advance the knife holder 68 and the knife blade 68*a* towards their advanced positions after the device 10 has been fired, the ring member 100*a* which is misaligned with the recess 92, causes the second spring arm 100 to bend towards the knife holder 68 such that the ring member 100*a* of the second spring arm 100 is positioned between the staple pusher 66 and the knife holder 68. By positioning the ring member 100*a* of the second spring arm 100 between the knife holder 68 and the staple pusher 66, the knife holder 68 is prevented from advancing to a position to re-expose the knife blade 68*a* (FIG. 10) through the knife slot 78.

Persons skilled in the art will understand that the devices and methods specifically described herein and illustrated in the accompanying drawings are non-limiting exemplary aspects of the disclosure. It is envisioned that the elements and features illustrated or described in connection with one exemplary embodiment may be combined with the elements and features of another without departing from the scope of the present disclosure. As well, one skilled in the art will appreciate further features and advantages of the disclosure based on the above-described aspects of the disclosure. Accordingly, the disclosure is not to be limited by what has been particularly shown and described, except as indicated by the appended claims.

What is claimed is:

1. A cartridge assembly comprising:
   a cartridge body defining a cavity, a knife slot, a plurality of staple pockets, and a tissue engaging surface, the knife slot and the plurality of staple pockets extending between the tissue engaging surface and the cavity;
   a plurality of staples, each of the plurality of staples received within one of the plurality of staple pockets;
   a staple pusher supported within the cavity of the cartridge body, the staple pusher movable from a retracted position to an advanced position to eject the plurality of staples from the plurality of staple pockets of the cartridge body;
   a knife holder supporting a knife blade and defining a recess, the knife holder positioned within the cavity of the cartridge body and movable between a retracted position and an advanced position to move the knife blade from a retracted position recessed within the cartridge body to an advanced position extending from the knife slot; and
   a biasing member receivable within the recess and positioned between the knife holder and the staple pusher within the cartridge body, the biasing member configured to urge the knife holder and the knife blade towards their retracted positions, and the biasing member comprising a first spring arm having a first ring member engaged with the knife holder and a second spring arm with a second ring member engaged with the staple pusher.

2. The cartridge assembly of claim 1, wherein the second spring arm is longitudinally misaligned with the recess when the staple pusher is in its advanced position and the knife holder is in its retracted position.

3. The cartridge assembly of claim 1, wherein the biasing member includes first and second spring arms, the first spring arm engaged with the knife holder and the second spring arm including a ring member that is engaged with the staple pusher, the ring member positioned within the recess when the staple pusher and knife holder are in their retracted positions and positioned between the staple pusher and the knife holder misaligned with the recess when the staple pusher is in its advanced position and the knife holder is in its retracted position.

4. The cartridge assembly of claim 3, wherein the ring member has a diameter to prevent advancement of the knife blade from the knife slot when the ring member is misaligned with the recess.

5. The cartridge assembly of claim 1, wherein the biasing member includes a leaf spring.

6. The cartridge assembly of claim 5, wherein the leaf spring includes a bend defined between the first and second spring arms.

7. The cartridge assembly of claim 1, wherein the biasing member includes a torsion spring.

8. The cartridge assembly of claim 7, wherein the torsion spring includes a central coil positioned between the first and second spring arms.

9. The cartridge assembly of claim 8, wherein the cartridge body includes a post positioned with the recess, the post received within the central coil of the torsion spring.

10. A cartridge assembly comprising:
    a cartridge body defining a cavity, a knife slot, a plurality of staple pockets, and a tissue engaging surface, the knife slot and the plurality of staple pockets extending between the tissue engaging surface and the cavity;
    a plurality of staples, each of the plurality of staples received within one of the plurality of staple pockets;
    a staple pusher supported within the cavity of the cartridge body, the staple pusher movable from a retracted position to an advanced position to eject the plurality of staples from the plurality of staple pockets of the cartridge body;
    a knife holder supporting a knife blade, the knife holder positioned within the cavity of the cartridge body and movable between a retracted position and an advanced position to move the knife blade from a retracted position recessed within the cartridge body to an advanced position extending from the knife slot; and a biasing member positioned between the knife holder and the staple pusher within the cartridge body, the biasing member including first and second spring arms, the first spring arm engaged with the knife holder and the second spring arm engaged with the staple pusher to urge the knife holder and the knife blade towards their retracted positions, the second spring arm including a ring member that is engaged with the staple pusher, the ring member positioned between the staple pusher and the knife holder when the staple pusher is in its advanced position and the knife holder is in its retracted position.

11. A surgical stapling device comprising:

a handle assembly;

a frame including a U-shaped distal frame portion, the U-shaped distal frame portion including a first transverse portion, a second transverse portion, and a longitudinal portion connecting the first transverse portion and the second transverse portion, the first and second transverse portions defining a gap;

an anvil supported on the first transverse portion;

a clamp slide assembly including a distal cartridge support positioned within the gap; and a cartridge assembly supported on the distal cartridge support of the clamp slide assembly, the cartridge assembly including:

a cartridge body defining a cavity, a knife slot, a plurality of staple pockets, and a tissue engaging surface, the knife slot and the plurality of staple pockets extending between the tissue engaging surface and the cavity;

a plurality of staples, each of the plurality of staples received within one of the plurality of staple pockets;

a staple pusher supported within the cavity of the cartridge body, the staple pusher movable from a retracted position to an advanced position to eject the plurality of staples from the plurality of staple pockets of the cartridge body;

a knife holder supporting a knife blade and defining a recess, the knife holder positioned within the cavity of the cartridge body and movable between a retracted position and an advanced position to move the knife blade from a retracted position recessed within the cartridge body to an advanced position extending from the knife slot; and a biasing member receivable within the recess and positioned between the knife holder and the staple pusher within the cartridge body, the biasing member comprising a first spring arm with a first ring member engaged with the knife holder, and a second spring arm with a second ring member engaged with the staple pusher; and with the biasing member configured to urge the knife holder and the knife blade towards their retracted positions.

12. The surgical stapling device of claim 11, wherein the biasing member is received within the recess when the knife holder and the staple pusher are in their retracted positions.

13. The surgical stapling device of claim 11, wherein the biasing member includes a torsion spring.

14. The surgical stapling device of claim 11, wherein the biasing member includes a leaf spring.

15. The surgical stapling device of claim 11, wherein the knife holder defines a recess, the biasing member received within the recess when the knife holder and the staple pusher are in their retracted positions, the second spring arm including a ring member that is engaged with the staple pusher, the ring member positioned within the recess when the staple pusher and knife holder are in their retracted positions and positioned between the staple pusher and the knife holder misaligned with the recess when the staple pusher is in its advanced position and the knife holder is in its retracted position.

\* \* \* \* \*